United States Patent [19]

Riggs et al.

[11] 4,197,540
[45] Apr. 8, 1980

[54] SIMULTANEOUS TRANSMIT AND RECEIVE RADAR SUBSYSTEM

[75] Inventors: Denton D. Riggs, Rancho Palos Verdes; Gene A. Wagner, Torrance, both of Calif.

[73] Assignee: Hughes Aircraft Company, Culver City, Calif.

[21] Appl. No.: 935,408

[22] Filed: Aug. 21, 1978

Related U.S. Application Data

[63] Continuation of Ser. No. 791,273, Apr. 27, 1977, abandoned.

[51] Int. Cl.² .......................... G01S 7/28; H03K 1/10
[52] U.S. Cl. .............................. 343/17.2 R; 332/9 R; 375/57
[58] Field of Search .................. 343/17.2 R, 17.1 R, 343/18 E; 332/9 R; 325/65

[56] References Cited

U.S. PATENT DOCUMENTS

| | | |
|---|---|---|
| 2,817,832 | 12/1957 | Mathes . |
| 3,383,686 | 5/1968 | Davis et al. ............... 343/17.2 R |
| 3,403,394 | 9/1968 | Rouault ...................... 343/17.2 R |
| 3,603,995 | 12/1969 | Howard ...................... 343/17.2 R |

*Primary Examiner*—T. H. Tubbesing
*Attorney, Agent, or Firm*—Walter J. Adam; W. H. MacAllister

[57] ABSTRACT

A radar subsystem within a radar system has a transmitter circuit for transmitting pulse modulated waves on a multiplicity of frequencies. A duplexer is electrically connected to the output of the transmitter circuit. A receiver circuit is coupled to the duplexer for receiving the pulse modulated waves of the multiplicity of frequencies while transmitting on said multiplicity of frequencies, except such frequencies being received at the same time intervals as the frequencies being transmitted.

15 Claims, 2 Drawing Figures

SIMULTANEOUS TRANSMIT AND RECEIVE RADAR SUBSYSTEM

This is a continuation of application Ser. No. 791,273 filed Apr. 27, 1977, now abandoned.

BACKGROUND OF THE INVENTION

This invention is in the field of radar and particularly where the transmitter and receiver are simultaneously operative.

Simultaneous transmission and reception of radar waves and equipment therefor is known. However, transmitting a plurality of frequencies while simultaneously receiving all but one or more of the frequencies, reflected from a target, represents a void in the radar art.

SUMMARY OF THE INVENTION

A radar system having a subsystem comprises first means for transmitting pulse modulated waves at a plurality of frequencies. A duplexer is electronically connected to the output of the first means. Second means, electrically connected to and coupled to the output of the duplexer, provides the ability to receive the pulse modulated waves on the transmitting frequencies while transmitting on the plurality of frequencies, except such frequencies being received at the same time intervals as the frequencies being transmitted.

The first means comprises first, second and third continuous wave sources, each providing respectively the first, second and third frequencies. Such first means also includes a first electronic switch fed by the first, second and third sources and a summer electrically connected to and fed by the first electronic switch. A power amplifier, included in the first means, is electrically fed by the summer and a frequency separator is electrically connected to the power amplifier. A second electronic switch is also provided and connected to the frequency separator output as well as a second summer which is fed by the second electronic switch.

The second means comprises, a frequency separator fed by the duplexer, an electronic switch fed by the frequency separator, and first, second and third receivers, each being electrically connected to and fed by the electronic switch.

A pulse generating system provides a three phase output to each of the first and second means. The pulse generating system is electrically connected to the first and second electronic switches of the first means, and to the electronic switch of the second means.

DETAILED DESCRIPTION

Figure 1:
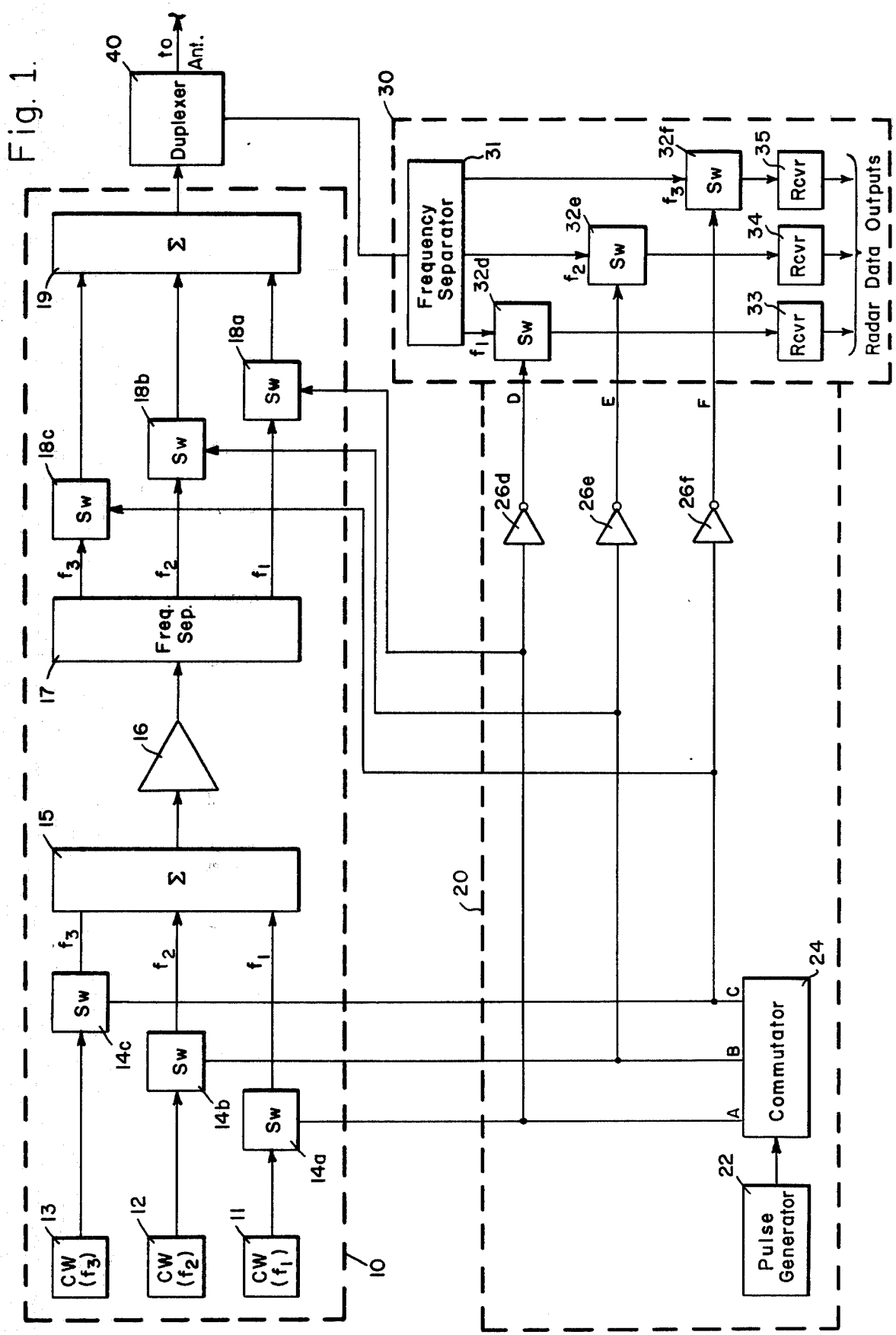
FIG. 1 is an electrical schematic of a transmitter circuit, a receiver circuit, a duplexer connecting the receiver and transmitter circuits, and a pulse generating system providing three phase repetition rate signals to the transmitter and receiver circuits, in accordance with the invention.
Figure 2:
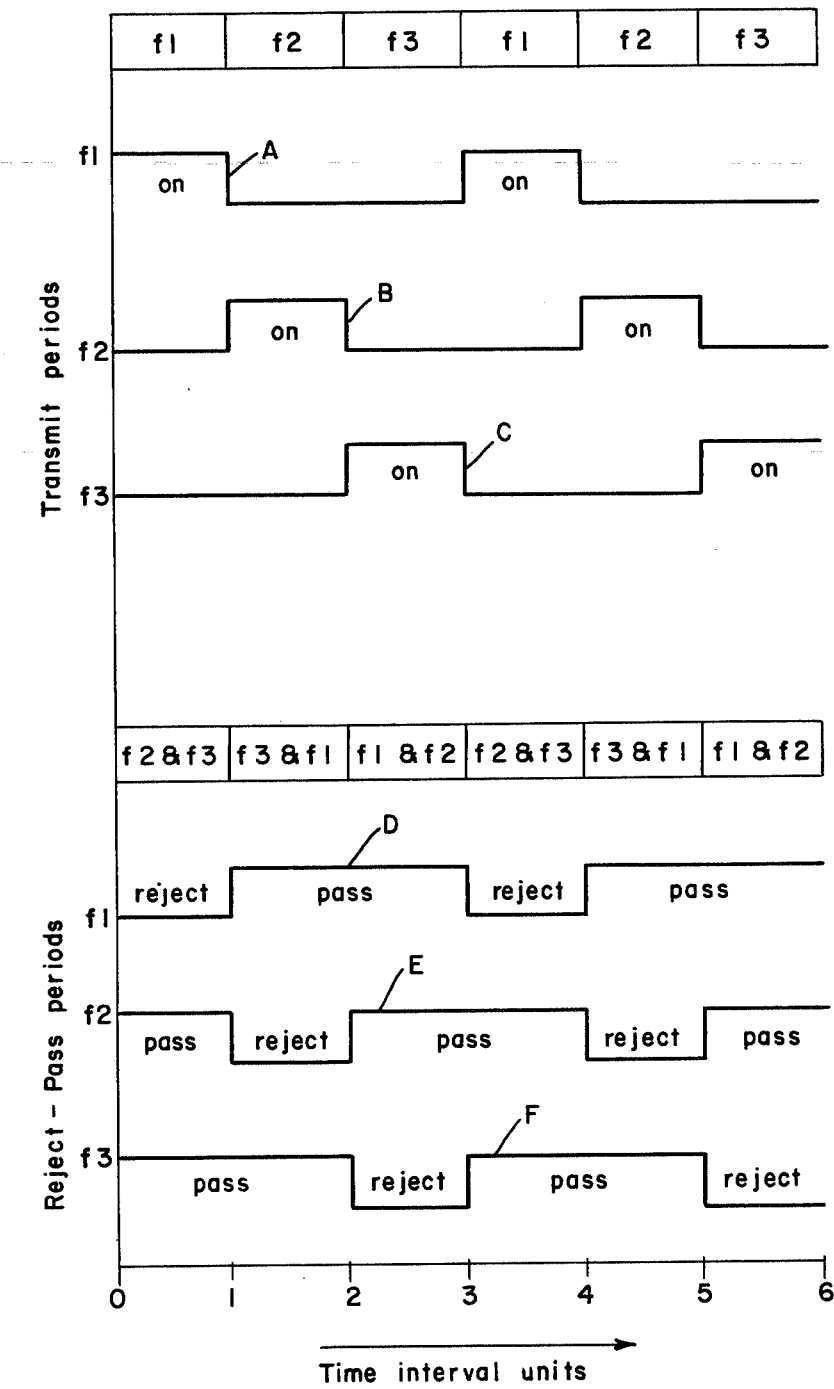
FIG. 2 is a waveform diagram as a function of time showing the three phase outputs from the pulse generating system and their inter-timing relationships.

Referring to FIGS. 1 and 2, a radar subsystem is illustrated such as may be used in radars which transmit and receive a multiplicity of radar frequencies with a single power amplifier and antenna. The transmission function of the power amplifier is continuous, as the power amplifier is sequentially switched to the different frequencies. Continuous transmission allows power to be transmitted with a lower peak value than possible in the prior art since the power amplifier does not have to be pulsed.

Reception is performed, simultaneously with transmission, on all frequencies except the one or ones being transmitted. The transmission and reception functions are commutated so that radar output data is obtained simultaneously on all frequencies. Three different frequencies are shown in the system, but it is understood that any number of different frequencies may be used.

Means 10 is provided for continuously transmitting pulse modulated waves at a multiplicity of frequencies. Specifically, CW sources 11, 12 and 13, at signals having frequencies $f_1$, $f_2$ and $f_3$ respectively, provide the particular RF frequencies for transmission. The three RF frequencies are applied to electronic switches 14a, 14b and 14c respectively. Switches 14a, 14b and 14c are controlled by pulse generating system 20 so that the frequencies are sequentially pulsed.

The pulse generating system establishes the basic pulse width and pulse repetition interval (PRI) for each frequency, and commutates the transmission and reception functions so that all frequencies are transmitted and received during any PRI, but no frequency is received at the same time it is transmitted. Such pulse generating system comprises pulse generator 22 feeding a conventional commutator 24, which commutator provides in predetermined sequence, in accordance with FIG. 2, waveforms A, B and C. Waveforms A, B and C are respectively fed into conventional electronic inverters 26d, 26e and 26f so as to provide outputs D, E and F from said inverters respectively, as also shown in FIG. 2. Inverter outputs are used to feed individual electronic switches within the receiver circuit as hereinbelow explained.

Switch group 14a, 14b and 14c, as well as switch group 18a, 18b and 18c to be later discussed, can therefore permit any combination of signals to be passed at the same time, such as signals comprised of $f_1$ and $f_2$, $f_2$ and $f_3$, $f_1$ and $f_3$, or each signal by itself. This is also true for the switch group 32d, 32e and 32f in receiver circuit 30, discussed below.

FIG. 2 illustrates the periods wherein each frequency is pulsed during any one time period. Waveform A shows the transmit periods for $f_1$, waveform B for $f_2$, and waveform C for $f_3$.

The outputs of switch group 14a, 14b and 14c provide signals having frequencies $f_1$, $f_2$ and/or $f_3$ selected as inputs to summer 15, which summer output provides signals to the input of power amplifier 16.

Amplifier 16 amplifies each of the frequencies to a high power level for transmission to the target. The signals from summer 15 allow a lower peak value to be required than if the same average power were obtained with a pulse waveform. The signals from summer 15 eliminate the need to pulse the amplifier, as in the prior art.

Amplifier 16 provides input of all frequencies into frequency separator 17. Separator 17 separates individual pulsed frequencies onto separate lines providing signals which are functions of $f_1$, $f_2$ and/or $f_3$ which had previously been respectively pulsed by passing signals A, B and C respectively through switches 14a, 14b and 14c. Each of such pulsed frequencies at the output of the frequency separator is applied respectively to electronic switches 18a, 18b and 18c. Such electronic switches are driven by commutator 24 and have waveforms A, B and C as needed applied to switches 18a, 18b and 18c respectively in synchronism with switches 14a, 14b and 14c respectively. Switches 18a, 18b and 18c suppress the noise between the pulses of each frequency so that the individual receiver for each frequency, in receiver circuit 30, will be able to receive signals between pulses. The switching action of switches 18a, 18b and 18c allows amplification of a continuous signal provided by power amplifier 16, dissimilar from typical multifrequency radars in the prior art, wherein pulsing of the power amplifier was required.

The outputs of switching group 18a, 18b and 18c are applied to summer 19. Summer 19 function is to recombine the individually pulsed frequencies on to a common line for application to duplexer 40 and then to a single common antenna (not shown). Summer 19 output constitutes the output of transmitter circuit 10, and is a continuous waveform with frequencies $f_1$, $f_2$ and $f_3$ which had been sequenced.

Duplexer 40 routes the signals from the transmitter to the antenna, and signals from the antenna to receiver circuit 30. Duplexer 40 also performs an isolation function between the transmitter and receiver to minimize leakage of high power transmitted signals into the receiver circuit.

Receiver circuit 30 receives simultaneously all frequencies and passes same therethrough except the one or the ones being transmitted during the same time periods, so that radar data is obtained simultaneously from all received frequencies. One output of duplexer 40, provides an input to frequency separator 31, coupling the antenna common to receiver and transmitter circuits, to the receiver circuit. Frequency separator 31 separates each of the received frequencies on to separate lines, at $f_1$, $f_2$ and $f_3$.

Separate inputs for each of the frequencies $f_1$, $f_2$ and $f_3$ are provided respectively to electronic switches 32d, 32e and 32f. Such electronic switches reject from reception, the frequency or frequencies being transmitted by circuit 10 during the same time periods. This rejection is performed using waveforms D, E, and F supplied at outputs of inverters 26d, 26e and 26f respectively. Electronic switches 32d, 32e and 32f sequence the received frequencies so that all frequencies are passed except that one or ones being transmitted during the same time invervals as the frequencies being received. The combined effect of frequency separator and switches 32d, 32e and 32f is to allow reception on some frequencies while other frequencies are being transmitted, unlike multifrequency single antenna radars in the prior art, wherein it has been necessary to terminate reception on all frequencies when any frequency was transmitted.

The outputs from electronic switches 32d, 32e and 32f are applied to individual receivers 33, 34 and 35 respectively. The functions of receivers 33, 34 and 35 are to provide simultaneous radar data outputs from all of the frequencies received. The signal from each frequency $f_1$, $f_2$ and/or $f_3$ is processed independently in each said receiver, and usual radar data output from each such receiver is provided at its respective output.

The foregoing illustrated and discussed components comprising the radar subsystem are all independently known in the art, and no details thereof are needed.

It is understood that the use of the term frequency was intended to include the particular signal consisting of both the modulus and the argument as applicable.

To enhance understanding of the invention, three signals of differing CW frequencies were used. However, it is obvious that any number of frequencies greater than one could be used with analogous results as discussed in the foregoing specification. It should also be understood that although equal time intervals were illustrated for ease of understanding, that such equal time intervals are not necessary as long as the transmit and receive periods for any single frequency do not overlap.

What is claimed is:

1. A radar system for transmitting signals from an antenna and receiving reflected signals by said antenna comprising:
   first means for being switched to selectively provide at predetermined time intervals, pulse modulated signals at each of a plurality of independent frequencies;
   duplexer means coupled to an output of said first means and coupled to said antenna for transmitting said pulse modulated signals, said duplexer means having an output terminal for passing reflected signals received from said antenna;
   second means coupled to said output terminal of the duplexer means, for being switched to selectively pass said reflected signals of the pulse modulated signals at said independent frequencies; and
   timing means coupled to said first and second means for providing switching signals for controlling said first means to sequentially pass during said predetermined time intervals, said pulse modulated signals each at a designated one of said independent frequencies from said first means to said duplexer means while blocking the signals at the other independent frequencies from passing to said duplexer means, and controlling said second means to sequentially block during the same predetermined time intervals, reflected signals at said designated ones of said independent frequencies while passing reflected signals at said other independent frequencies.

2. The combination of claim 1 in which said first means includes first switching means coupled to said timing means, and said second means includes first frequency separator means coupled to the output terminal of said duplexer means for simultaneously providing reflected signals at different ones of said independent frequencies to separate output terminals; and second switching means coupled to the separate output terminals of said first frequency separator means and to said timing means.

3. The combination of claim 2 in which said first switching means includes a plurality of first switches each receiving a pulse modulated signal at one of said independent frequencies; and
   said first means further includes a pulse generating circuit for providing a plurality of said pulse modulated signals at different frequencies, and first summing means coupled to said plurality of first switches for providing said pulse modulated signals at a common terminal to said duplexer means.

4. The combination of claim 3 in which said first means further comprises power amplifier means coupled between said pulse generating circuit and said plurality of first switches, whereby said plurality of first switches blocks noise from said power amplifier means.

5. The combination of claim 4 in which said pulse generating circuit includes a signal source of a plurality of continuous wave signals, one signal at each of said different frequencies, third switching means coupled to said signal source and said timing means, said third switching means being responsive to said timing means for receiving said switching signals to sequentially pass different ones of said continuous wave signals as said pulse modulated signals, second summing means coupled to said third switching means and to said power amplifier means for passing said pulse modulated signals to said power amplifier means; and said first means further including second frequency separator means coupled between said power amplifier means and said plurality of first switches.

6. The combination of claim 5 in which said signal source includes a plurality of continuous wave sources and said third switching means includes a plurality of third switches with each coupled to a different one of said plurality of continuous wave sources.

7. The combination of claim 6 in which said timing means includes means to provide said switching signals for controlling said plurality of first and third switches so that both are simultaneously controlled to pass said sequential ones of said pulse modulated signals.

8. The combination of claim 7 in which said second switching means includes a plurality of second switches coupled to said first frequency separator means and responsive to said timing means.

9. The combination of claim 8 further including receiver means coupled to said plurality of second switches.

10. The combination of claim 8 in which said timing means includes a pulse generator and a commutator coupled to said pulse generator for providing said switching signals.

11. In a radar system, a radar subsystem comprising the combination:

first means for transmitting pulse modulated waves of a plurality of independent frequencies, said first means comprising:

a plurality of continuous wave sources, each providing respectively an independent frequency, a first electronic switching circuit electrically connected to and fed by the plurality of sources, a first summer electrically connected to and fed by the first electronic switching circuit, a power amplifier electrically connected to and fed by the first summer, a frequency separator electrically connected to and fed by the power amplifier, a second electronic switching circuit, for rejecting power amplifier noise, coupled to and fed by the frequency separator, and a second summer electrically connected to and fed by the second electronic switching circuit;

a duplexer electrically connected to an output of the first means; and second means, electrically coupled to an output of the duplexer, for passing reflected signals of the pulse modulated waves of said independent frequencies and for rejecting signals being transmitted by the first means in the same time interval as the signals are passed.

12. The invention as stated in claim 11, including a pulse generating circuit electrically connected to and feeding the first and second electronic switching circuits.

13. A method for simultaneously transmitting and receiving radar signals having independent frequencies, comprising in combination the steps of:

(a) sequentially transmitting a plurality of pulse modulated signals of said independent frequencies for reflection of said signals from a target, including the sub-steps of:

generating a plurality of signals at different radar frequencies;

switching the generated signals in a predetermined order;

combining the switched signals for application to a power amplifier;

separating the combined signals;

switching the separated signals in accordance with said predetermined order for rejecting power amplifier noise;

combining the switched and separated signals; and (b) receiving the reflected signals of said different frequencies and passing all said reflected signals except such received signals having frequencies which are transmitted in the same time interval as the reflected signals are received.

14. The method as stated in claim 8, wherein step (b) comprises:

separating the reflected signals on to separate terminals;

switching the separated signals; and feeding the switched and separated signals, each to an independent receiver input.

15. A system comprising:

A plurality of continuous wave sources, each providing a wave at an independent frequency;

a plurality of first switching means each coupled to one of said plurality of continuous wave sources for sequentially providing pulse modulated waves at said independent frequencies;

first summing means coupled to said plurality of first switching means;

a power amplifier coupled to said first summing means;

a frequency separator coupled to said power amplifier;

a plurality of second switching means coupled to said frequency separator;

second summing means coupled to said plurality of second switching means; and timing means coupled to said plurality of first switching means and to said plurality of second switching means for simultaneously controlling said first and second switching means to pass said pulse modulated waves at sequential ones of said independent frequencies whereby said plurality of second switching means blocks noise received from said power amplifier.

* * * * *